Nov. 4, 1952

E. W. DAVIS 2,616,523

LUBRICATING APPARATUS

Original Filed Aug. 18, 1943

Inventor:
Ernest W. Davis

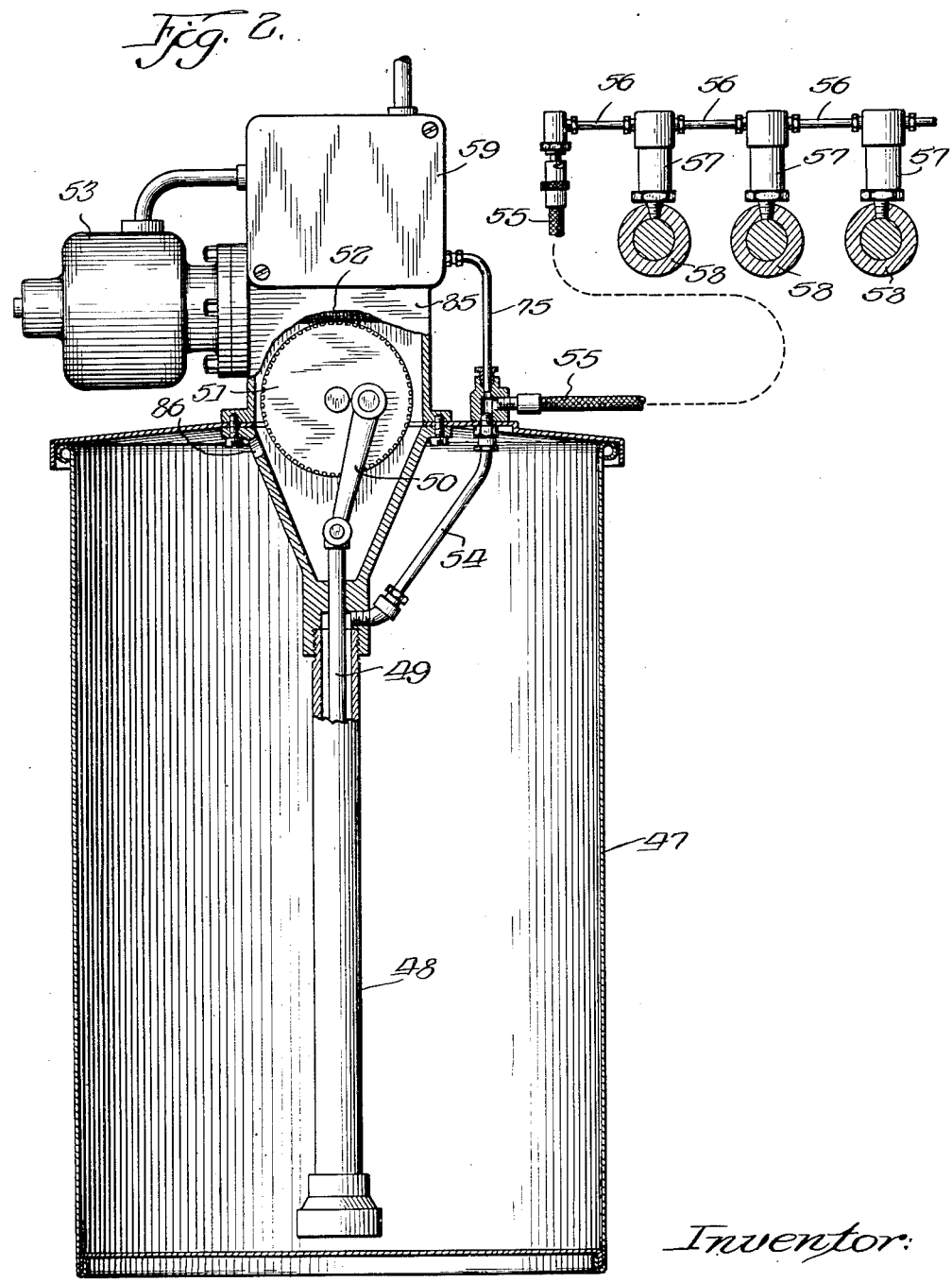

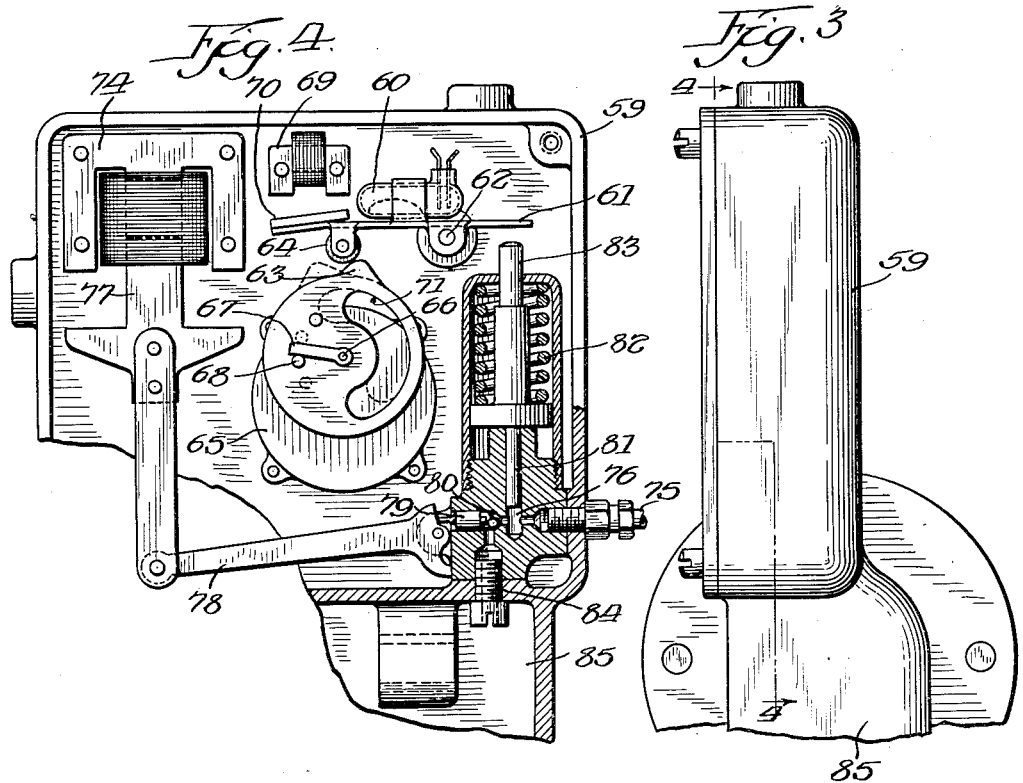

Patented Nov. 4, 1952

2,616,523

UNITED STATES PATENT OFFICE 2,616,523

LUBRICATING APPARATUS

Ernest W. Davis, River Forest, Ill.

Substituted for application Serial No. 499,157, August 18, 1943. This application January 11, 1946, Serial No. 640,526

18 Claims. (Cl. 184—26)

My invention relates to lubricating apparatus, and more particularly to a power driven lubricant pump provided with mechanism for automatically starting the pump in operation at regularly recurring time intervals, whereupon the pump builds up a predetermined lubricant pressure, then automatically stops pumping, and releases the pressure. A pump of this class is useful for supplying lubricant to a plurality of measuring valves designed for proportioning the flow of lubricant to a plurality of bearings requiring lubrication.

One object of this invention is to provide a pump of the class described, which is durable and dependable in operation, which is simple in construction, and which can be manufactured at a comparatively low cost.

Another object is to provide means for immediately releasing the pressure at the outlet of the pump as soon as the required predetermined pressure has been reached. These and other objects will appear as the description proceeds.

The generic principle of this invention is adaptable for embodiment in either an air driven pump or an electrically driven pump, both of which are illustrated in the accompanying drawings, in which Fig. 1 is an elevation of the air driven pump, shown partly in central longitudinal section;

Fig. 2 is an elevation of the electrically driven pump, shown partly in central longitudinal section;

Fig. 3 is an end elevation of the control box for controlling the electric motor illustrated in Fig. 2;

Fig. 4 is a section through the control box, the section being made on the line 4—4 of Fig. 3; and Fig. 5 is a diagrammatic view of the controlling mechanism and the electric wiring used therein.

Figure 1:
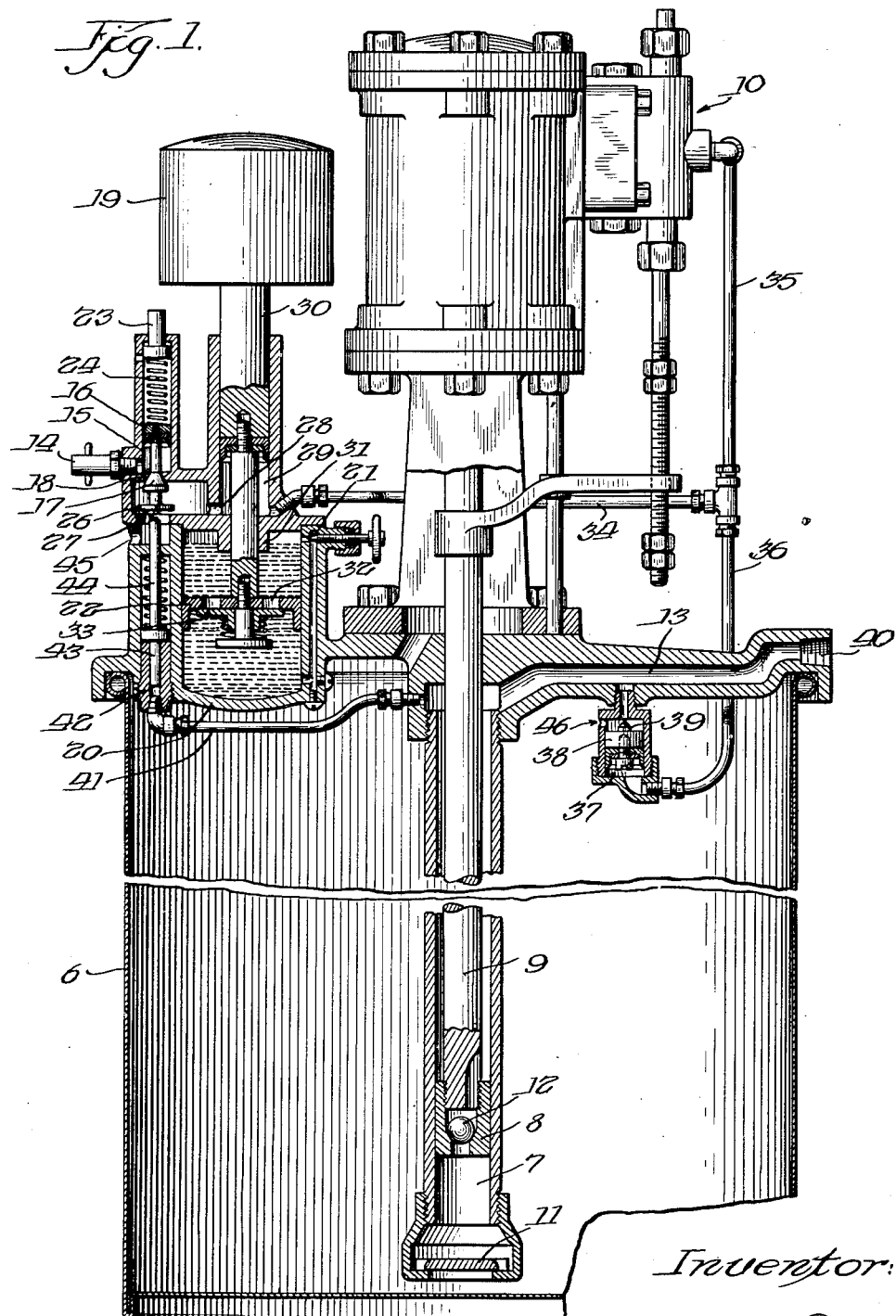

This application is a substitute application for my prior abandoned application, Serial No. 499,157, filed August 18, 1943.

Referring to Fig. 1, the air driven pump utilizes a lubricant container 6 for holding lubricant to be pumped (not shown), and is provided with a pump cylinder 7, in which the piston 8 reciprocates. The piston rod 9 is driven with reciprocating motion by the air engine 10, which may be constructed in accordance with any one of many designs, well known to those skilled in the art. The foot valve 11 prevents reverse flow of lubricant from the cylinder 7 to the container 6, and the check valve 12 prevents reverse flow of lubricant through the piston 8, so that reciprocating movement of the piston 8 will cause lubricant to be withdrawn from the lubricant container 6 and discharged into the discharge outlet 13, as will be readily understood.

The controlling mechanism for controlling the operation of the air engine 10 will now be described. The air fitting 14 is adaptable for connection with an air coupling on an air hose connected with a source of air under pressure. Throughout the period of use of the apparatus, compressed air flows through the air fitting 14 into the lowermost part of the air cylinder 15, where it exerts a continuous upward pressure against the piston 16, which pressure continuously tends to urge the piston 16 to move in an upward direction, thereby tending to hold the valve 17 against its seat 18, which is of smaller area than the piston 16. In this deenergizing position of the valve 17, the compressed air is confined within the air cylinder 15, and therefore cannot operate the air engine 10, which remains stationary until the valve 17 is opened by means which will now be described.

The force of gravity continuously tends to urge the weight 19 in a downward direction, but its downward movement is retarded by restriction to the flow of oil from the oil cylinder 20 through the adjustable needle valve 21, as caused by the resulting downward movement of the piston 22. The oil contained in the oil cylinder 20 may be composed of a mixture of castor oil and alcohol, which mixture has a nearly constant viscosity throughout ordinary normal changes in temperature, so that the weight 19 will always descend at a uniform rate of motion. Manual adjustment of the needle valve 21 may be used for adjusting the downward movement of the weight 19, so as to provide the rate of movement desired.

As the weight 19 continues to move in a downward direction, it will eventually engage the pin 23, so as to compress the spring 24. When the spring 24 is compressed sufficiently, it pops the valve 17 to its open position and closes the valve 26 against the valve seat 27. When the valve 17 opens, the resulting momentary decrease of air pressure against the piston 16 tends to give the valve a desirable pop action, and a moment later the air pressure above the valve 26 holds the valve 26 down against its seat 27 with a force in excess of the upward pressure against the piston 16, because the area of the valve 26 is greater than that of the piston 16.

Compressed air then passes through the port 28 and into the air cylinder 29, thereby exerting an upward thrust on the plunger 30, so as to raise the weight 19 until the piston 22 engages the boss 31. During this upward movement of the piston 22, oil within the oil cylinder 20 passes through the openings 32, and around the check valve 33.

Compressed air also passes from the air cylinder 29 into the air tubes 34 and 35 and into the air engine 10, which then begins reciprocating the piston 8 so as to pump lubricant under pressure into the discharge outlet 13. Compressed air also passes through the air tube 36, and into the air cylinder 37, where it urges the piston 38 upwardly to close the pressure release valve 39, whereby pressure may be built up in the discharge outlet 13. It is understood, of course, that the discharge opening 40 is connected with a lubricant line for conducting lubricant to a plurality of suitable metering devices for proportioning the discharge of lubricant into a plurality of bearings requiring lubrication.

After the metering devices have discharged their measured amounts of lubricant, they automatically obstruct any further flow of lubricant into the bearings, so that the pressure then builds up in the discharge outlet until the lubricant pressure transmitted through the tube 41 and into the lubricant cylinder 42, pushes the plunger 43 upwardly, thereby forcing the valve pin 44 against the valve 26, so as to open the valve against the action of the air pressure that tends to hold the valve 26 closed. There is sufficient compressibility in the lubricant filling the lubricant line, and in the air in the air engine, to move the valve 26 upwardly so as to seat the valve 17 in a fraction of a second, whereupon the air pressure in the air cylinder 15 then retains the valve 17 in its closed position by exerting pressure against the piston 16 in the manner hereinbefore described.

When the valve 17 is closed, the valve 26 is opened, so that the air exhaust port 45 then connects the air cylinders 29 and 37 with the atmosphere, thereby dissipating their internal pressures. The internal pressure in the air engine 10 is dissipated at the same time and stops operating. The lubricant pressure acting on the valve 39, which is no longer held closed by air pressure, causes the valve 39 to open, whereupon lubricant flows from the discharge outlet 13, past the pressure release valve 39, out through the lubricant vent 46, and back into the container 6. The absence of air pressure in the air cylinder 29 then permits the weight 19 to move downwardly, so that after a predetermined time interval, depending in duration upon the adjustment of the needle valve 21, the cycle of operation hereinbefore described will be repeated.

The functions of the various elements of this pump have been explained, and the complete operation will now be described.

The weight 19 falls slowly by the action of gravity, thereby displacing oil in the oil cylinder 20 at a rate determined by the setting of the needle valve 21, so as to retard the movement of the weight 19 to provide a time cycle of the desired duration. When the weight 19 engages the pin 23, the spring 24 is compressed and then pops the valve 17 to its open position, in the manner hereinbefore described, thereby closing the valve 26 and applying air pressure to the air engine 10, and the air cylinders 29 and 37. This starts the air engine 10 in operation, it raises the weight 19 to its uppermost position, and it closes the pressure release valve 39 in the manner hereinbefore described. Lubricant pressure built up in the lubricant cylinder 42 then forces the plunger 43 upwardly to close the valve 17 and open the valve 26, thereby stopping the air engine 10 and allowing the pressure release valve 39 to open. The weight 19 then begins to fall in repetition of the cycle of operation just described.

In the electrically driven pump, Fig. 2, the lubricant container 47 contains lubricant (not shown) for supplying the lubricant pump 48. The pump 48 is provided with a piston rod 49, which is reciprocated by the connecting rod 50 actuated by the worm gear 51. The worm gear 51 is driven by the worm 52, which is rotated by the electric motor 53. The lubricant pump 48 discharges lubricant under pressure into the lubricant tube 54 and the conduit 55, which connects with the lubricant line 56 containing a number of measuring devices 57 for proportioning the flow of lubricant into the bearings 58.

The control box 59 (shown in greater detail in Fig. 4) contains a mercury switch 60, which is supported by a tilting bracket 61 pivoted at the pivot pin 62. The tilting bracket 61 is moved in a clockwise direction by engagement of the rotatable cam 63 with the roller 64, and is moved in a counterclockwise direction by the action of gravity. A self-starting synchronous clock-type motor 65 is provided with a slow speed shaft 66, to which is secured a driving arm 67, which engages the lug 68 to cause rotation of the cam 63, which is rotatable on the shaft 66.

When rotation of the cam 63 in a counterclockwise direction closes the mercury switch 60, current is supplied to the electromagnet 69, as indicated in the wiring diagram (Fig. 5) and this results in the armature 70 being held against the magnet 69 so as to retain the switch 60 in closed position independent of the action of the cam 63. Referring again to Fig. 4, it will be observed that the cam 63 is cut away at 71, so that the center of gravity of the cam 63 will lie at the left of the shaft 66. Owing to this eccentric center of gravity of the cam 63, which is freely rotatable on the shaft 66, the retention of the armature 70 permits the cam 63 to rotate by the action of gravity to the advanced position illustrated by the dotted lines. With the cam in this position, the release of the armature 70 by means which will be described hereinafter, will permit sufficient movement of the tilting bracket 61 in a counterclockwise direction so as to open the switch 60.

Referring again to Fig. 5, it will be observed that the synchronous motor 65 is in continuous connection with the power lines 72 and 73, so that the motor 65 will run continuously. This will produce intermittent closing of the mercury switch 60, and each time the switch is closed it supplies current to the magnet 69, the solenoid 74, and the electric motor 53. Rotation of the motor 53 results in building up a pressure in the lubricant tube 54 (Fig. 2) as explained hereinbefore, and this pressure is transmitted by the connecting tube 75, to the lubricant cylinder 76 (Fig. 4). When the solenoid 74 is energized, it moves the armature 77 upwardly, and this causes upward oscillating movement of the lever 78, so that the plunger 79 is moved forcefully towards the right, thereby holding the ball valve 80 closed against the lubricant pressure in the lubricant cylinder 76.

When the lubricant pressure in the lubricant cylinder 76 reaches a predetermined value, it causes upward movement of the plunger 81 against the action of the spring 82, so that the thrust pin 83 engages the tilting bracket 61, and forcibly separates the armature 70 from the magnet 69, thereby opening the switch 60 and permitting the motor 53 to stop rotating, and thereby deenergizing the magnet 69 and the solenoid 74. This permits the armature 77 and lever 78 to fall to the positions shown in Fig. 4, so that the lubricant under pressure in the lubricant cylinder 76 can then open the valve 80 and pass through the hollow screw 84, and into the gear box 85, where the successive discharges may accumulate and furnish lubrication for the working parts contained therein. In the course of time, excess lubricant may escape through the vent opening 86 (Fig. 2) and drop back into the lubricant container 47.

The functions of the various elements of this pump have been explained, and the complete operation will now be described.

The synchronous motor 65 (Fig. 4) runs continuously and rotates the cam 63 in a counter-clockwise direction. Engagement of the cam with the roller 64 causes intermittent closing of the mercury switch 60. Each time the tilting bracket 61 is moved so as to close the switch 60, the magnet 69, solenoid 74, and electric motor 53 are energized. This causes the magnet to retain the armature 70 so that the switch 60 is retained in its closed position. Tilting of the bracket 61 in a clockwise direction allows the cam 63 to advance slightly so as to permit reopening of the switch 60, and it results in closing of switch 69 to energize the solenoid 74 and thereby close the ball valve 80 so that lubricant pressure can be built up in the lubricant line 56 (Fig. 2). When a predetermined pressure has been attained, the lubricant pressure in the lubricant cylinder 76 (Fig. 4) causes the thrust pin 83 to open the switch 60. The electric motor 53 then stops, the ball valve 80 is opened by the lubricant pressure, and the magnet 69 no longer attracts the armature 70. Continued rotation of the cam 63 then causes the above cycle of operation to be repeated at regularly recurring time intervals.

It will be observed that in both the air operated pump and the electrically driven pump, the pressure is released as soon as it reaches a predetermined value. The two pumps, although different in appearance, and fundamentally similar in that they both employ the same generic principle of operation. In each construction the lubricant pump is driven by operating mechanism actuated by a source of power controlled by a movable member, movable to starting and stopping positions. They each provide means, operable while the apparatus is in use, continuously tending to urge said movable member towards said stopping position. They each provide means for moving the movable member against the action of said urging means to said starting position. They each provide means for retaining the movable member in that position, and they each provide means, responsive to the lubricant pressure, for rendering the retaining means ineffectual, so that the urging means may then move the movable member to said stopping position and thereby stop the pump.

Without further elaboration, the foregoing will so fully explain my invention that others may, by applying knowledge current at the time of application, readily adapt the same for use under various conditions of service.

I claim:

1. In lubricating apparatus, a lubricant pump having a discharge outlet, power driven operating mechanism having a driving connection with said pump for operating said lubricant pump, a source of power, power controlling means connected with said source and with said operating mechanism for intermittently connecting said operating mechanism with said source of power, said power controlling means including a movable member movable to an energizing position in which said operating mechanism is connected with said source of power, and to a deenergizing position in which said operating mechanism is disconnected from said source of power, means continuously tending to urge said movable member toward said deenergizing position while the apparatus is in use, movable means mechanically engageable with said movable member for moving said movable member to said energizing position, other means for retaining said movable member in said energizing position, and means movable in response to the lubricant pressure in said discharge outlet and mechanically engageable with said movable member for rendering said retaining means ineffectual, whereby said urging means may then move said movable member to said deenergizing position.

2. In lubricating apparatus, a lubricant pump having a discharge outlet, power driven operating mechanism having a driving connection with said pump for operating said lubricant pump, a source of power, power controlling means connected with said source and with said operating mechanism for intermittently connecting said operating mechanism with the source of power, said power controlling means including a movable member movable to an energizing position in which said operating mechanism is connected with said source of power, and to a deenergizing position in which said operating mechanism is disconnected from said source of power, means operable throughout the period of use of the apparatus continuously tending to urge said movable member toward said deenergizing position, time responsive movable means mechanically impingeable upon said movable member for intermittently moving said movable member to said energizing position, other means for retaining said movable member in said energizing position, and means movable in response to the lubricant pressure in said discharge outlet and mechanically impingeable upon said movable member for rendering said retaining means ineffectual, whereby said urging means may then move said movable member to said deenergizing position.

3. In lubricating apparatus, a lubricant pump having a discharge outlet, operating mechanism for operating said lubricant pump, said operating mechanism being actuated by a supply of fluid under pressure, valve means including a valve member for controlling the flow of said fluid to said operating mechanism, said valve member being movable to open and closed positions, means continuously tending to urge said valve member toward said closed position, movable means mechanically engageable with said valve member for intermittently moving said valve member to said open position, other means for retaining said valve member in said open position, and means movable in response to the lubricant pressure in said discharge outlet and mechanically engageable with said valve member for rendering said retaining means ineffectual, whereby said urging means may then move said valve to said closed position.

4. In lubricating apparatus, a lubricant pump having a discharge outlet, operating mechanism for operating said lubricant pump, said operating mechanism being actuated by a supply of fluid under pressure, a valve for controlling the flow of said fluid to said operating mechanism, said valve being movable to open and closed positions, fluid pressure actuated means continuously tending to urge said valve toward said closed position, means for intermittently moving said valve to said open position, other means for retaining said valve in said open position, and means responsive to the lubricant pressure in said discharge outlet for rendering said retaining means ineffectual, whereby said urging means may then move said valve to said closed position.

5. In lubricating apparatus, a lubricant pump having a discharge outlet, operating mechanism for operating said lubricant pump, said operating mechanism being actuated by a supply of fluid under pressure, a valve for controlling the flow of said fluid to said operating mechanism, said valve being movable to open and closed positions, means continuously tending to urge said valve toward said closed position, resilient means for opening said valve against the action of said urging means, time controlled means for energizing said resilient means, means other than said resilient means for retaining said valve in said open position, and means responsive to the lubricant pressure in said discharge outlet for rendering said retaining means ineffectual, whereby said urging means may then move said valve to said closed position.

6. In lubricating apparatus, a lubricant pump having a discharge outlet, operating mechanism for operating said lubricant pump, said operating mechanism being actuated by a supply of fluid under pressure, a valve for controlling the flow of said fluid to said operating mechanism, said valve being movable to open and closed positions, means continuously tending to urge said valve toward said closed position, means for intermittently moving said valve to said open position, means actuated by said fluid pressure for retaining said valve in said open position, and means responsive to the lubricant pressure in said discharge outlet for rendering said retaining means ineffectual, whereby said urging means may then move said valve to said closed position.

7. In lubricating apparatus, a lubricant pump having a discharge outlet, operating mechanism for operating said lubricant pump, said operating mechanism being actuated by a supply of fluid under pressure, a valve for controlling the flow of said fluid to said operating mechanism, said valve being movable to open and closed positions, means continuously tending to urge said valve toward said closed position, gravity actuated means for intermittently moving said valve to said open position, other means for retaining said valve in said open position, and means responsive to the lubricant pressure in said discharge outlet for rendering said retaining means ineffectual, whereby said urging means may then move said valve to said closed position.

8. In lubricating apparatus, a lubricant pump having a discharge outlet, operating mechanism for operating said lubricant pump, said operating mechanism being actuated by a supply of fluid under pressure, a valve for controlling the flow of said fluid to said operating mechanism, said valve being movable to open and closed positions, means continuously tending to urge said valve toward said closed position, a weight, means actuated by the pressure of said fluid for intermittently raising said weight, means actuated by the falling of said weight for moving said valve to said open position against the action of said urging means, means independent of the position of said weight for retaining said valve in said open position, and means responsive to the lubricant pressure in said discharge outlet for rendering said retaining means ineffectual, whereby said urging means may then move said valve to said closed position.

9. In lubricating apparatus, a lubricant pump having a discharge outlet, operating mechanism for operating said lubricant pump, said operating mechanism being actuated by a supply of fluid under pressure, a valve for controlling the flow of said fluid to said operating mechanism, said valve being movable to open and closed positions, means continuously tending to urge said valve toward said closed position, gravity actuated means for intermittently moving said valve to said open position, retarding means for retarding the motion produced by said gravity actuated means, means other than said gravity actuated means for retaining said valve in said open position, and means responsive to the lubricant pressure in said discharge outlet for rendering said retaining means ineffectual, whereby said urging means may then move said valve to said closed position.

10. In lubricating apparatus, a lubricant pump having a discharge outlet, operating mechanism for operating said lubricant pump, said operating mechanism being actuated by a supply of fluid under pressure, a valve for controlling the flow of said fluid to said operating mechanism, said valve being movable to open and closed positions, means continuously tending to urge said valve toward said closed position, a weight, means actuated by the pressure of said fluid for intermittently raising said weight, means actuated by the falling of said weight for moving said valve to said open position against the action of said urging means, means independent of the position of said weight for retaining said valve in said open position, means responsive to the lubricant pressure in said discharge outlet for rendering said retaining means ineffectual, whereby said urging means may then move said valve to said closed position, and means responsive to the lubricant pressure in said discharge outlet for releasing the pressure of said fluid in said weight raising means.

11. In lubricating apparatus, a lubricant pump having a discharge outlet, operating mechanism for operating said lubricant pump, said operating mechanism being actuated by a supply of fluid under pressure, a valve for controlling the flow of said fluid to said operating mechanism, said valve being movable to open and closed positions, means continuously tending to urge said valve toward said closed position, a timing device energized by said fluid pressure, means responsive to said timing device for intermittently moving said valve to said open position, other means for retaining said valve in said open position, and means responsive to the lubricant pressure in said discharge outlet for rendering said retaining means ineffectual, whereby said urging means may then move said valve to said closed position.

12. In lubricating apparatus, a lubricant pump having a discharge outlet, electrically powered operating mechanism for operating said lubricant pump, a switch for controlling the supply of electricity to said operating mechanism, said switch being movable to open and closed positions, means continuously tending to urge said switch toward said open position, movable means mechanically engageable with said switch for intermittently moving said switch to said closed position, other means for retaining said switch in said closed position, and means movable in response to the lubricant pressure in said discharge outlet and mechanically engageable with said switch for rendering said retaining means ineffectual, whereby said urging means may then move said switch to said open position.

13. In lubricating apparatus, a lubricant pump having a discharge outlet, electrically powered operating mechanism for operating said lubricant pump, a switch for controlling the supply of electricity to said operating mechanism, said switch being movable to open and closed positions, gravity actuated means continuously tending to urge said switch toward said open position, movable means impingeable upon said switch for intermittently moving said switch to said closed position, other means for retaining said switch in said closed position, and means responsive to the lubricant pressure in said discharge outlet and impingeable upon said switch for rendering said retaining means ineffectual, whereby the action of gravity may then move said switch to said open position.

14. In lubricating apparatus, a lubricant pump having a discharge outlet, electrically powered operating mechanism for operating said lubricant pump, a switch for controlling the supply of electricity to said operating mechanism, said switch being movable to open and closed positions, means continuously tending to urge said switch toward said open position, a rotating cam for actuating said switch, means for rotating said cam at a uniform rate of speed, means for periodically accelerating the speed of said cam, means responsive to the closing of said switch for retaining said switch in said closed position, and means responsive to the lubricant pressure in said discharge outlet for rendering said retaining means ineffectual, whereby said urging means may then move said switch to said open position.

15. In lubricating apparatus, a lubricant pump having a discharge outlet, electrically powered operating mechanism for operating said lubricant pump, a switch for controlling the supply of electricity to said operating mechanism, said switch being movable to open and closed positions, means continuously tending to urge said switch toward said open position, a cam for actuating said switch, means for driving said cam, means for periodically advancing said cam relative to said driving means, means responsive to the closing of said switch for retaining said switch in said closed position, and means responsive to the lubricant pressure in said discharge outlet for rendering said retaining means ineffectual, whereby said urging means may then move said switch to said open position.

16. In lubricating apparatus, a lubricant pump having a discharge outlet, electrically powered operating mechanism for operating said lubricant pump, a switch for controlling the supply of electricity to said operating mechanism, said switch being movable to open and closed positions, means continuously tending to urge said switch toward said open position, a rotatable shaft, means for rotating said shaft, a rotatable cam driven by said shaft and rotatable relative thereto, means responsive to the closing of said switch for advancing said cam relative to said rotatable shaft, means responsive to the rotation of said cam for moving said switch to said closed position, means responsive to the closing of said switch for retaining said switch in said closed position, and means responsive to the lubricant pressure in said discharge outlet for rendering said retaining means ineffectual, whereby said urging means may then move said switch to said open position.

17. In lubricating apparatus, a lubricant pump having a discharge outlet, electrically powered operating mechanism for operating said lubricant pump, an electric switch for controlling the electricity supplied to said operating mechanism, said switch being movable to open and closed positions, gravity actuated means for opening said switch, movable mechanical means engageable with said switch for closing said switch against the action of said gravity actuated means, electromagnetic means for retaining said switch in said closed position, and means movable in response to the lubricant pressure in said discharge outlet and engageable with said switch for rendering said retaining means ineffectual.

18. In lubricating apparatus, a lubricant pump having a discharge outlet, electrically powered operating mechanism for operating said lubricant pump, a switch for controlling the supply of electricity to said operating mechanism, said switch being movable to open and closed positions, means continuously tending to urge said switch toward said open position, movable means impingeable upon said switch for intermittently moving said switch to said closed position, other means for retaining said switch in said closed position, means impingeable upon said switch in response to the lubricant pressure in said discharge outlet for rendering said retaining means ineffectual, whereby said urging means may then move said switch to said open position, a pressure release valve for releasing the lubricant pressure in said discharge outlet, and electrically actuated means for controlling said pressure release valve, said valve controlling means being controlled by said switch.

ERNEST W. DAVIS.

REFERENCES CITED

The following references are of record in the file of this patent:

UNITED STATES PATENTS

| Number | Name | Date |
| --- | --- | --- |
| 1,737,124 | Phelps | Nov. 26, 1929 |
| 1,799,026 | Serpas | Mar. 31, 1931 |
| 1,900,754 | Blanchard | Mar. 7, 1933 |
| 2,206,335 | Rotter | July 2, 1940 |
| 2,328,812 | Klein | Sept. 7, 1943 |
| 2,339,532 | Venable | Jan. 18, 1944 |